United States Patent [19]
Graham et al.

[11] 4,382,282
[45] May 3, 1983

[54] TRIM CONTROL SYSTEM FOR REDUCED DRAG

[75] Inventors: Donald E. Graham; Raymond A. Nelson; Edmond E. Olive, all of Phoenix, Ariz.

[73] Assignee: Sperry Corporation, New York, N.Y.

[21] Appl. No.: 185,096

[22] Filed: Sep. 8, 1980

[51] Int. Cl.³ .................. G06F 15/50; G05D 1/08
[52] U.S. Cl. .................. 364/434; 244/178; 244/181; 318/584
[58] Field of Search .............. 364/434, 435; 318/584; 244/178, 181, 194, 195

[56] References Cited

U.S. PATENT DOCUMENTS

| | | | |
|---|---|---|---|
| 3,079,109 | 2/1963 | Jude et al. | 244/183 |
| 3,378,217 | 4/1968 | Diani | 244/178 X |
| 3,409,251 | 11/1968 | Lawson et al. | 364/434 X |
| 3,504,248 | 3/1970 | Miller | 318/616 X |
| 3,936,715 | 2/1976 | Nixon et al. | 318/584 X |
| 4,032,093 | 6/1977 | Bonne et al. | 244/178 X |

*Primary Examiner*—Jerry Smith
*Attorney, Agent, or Firm*—Howard P. Terry

[57] ABSTRACT

In an automatic flight control system of the type having automatic stabilizer trim control, the long term, constant altitude cruise trim threshold limits which alter the maximum and minimum pull-in/drop-out deflection of the elevator relative to the stabilizer minimize the steady-state downward deflection of the elevator, thereby reducing unnecessary aerodynamic drag and realizing significant savings in fuel costs.

5 Claims, 5 Drawing Figures

TRIM CONTROL SYSTEM FOR REDUCED DRAG

BACKGROUND OF THE INVENTION

1. Field of the Invention

This invention relates to aircraft automatic flight control systems, and more specifically to those systems which provide automatic stabilizer trim control.

2. Background of the Invention

Automatic flight control systems which provide automatic trim control are well known in the art, an example of which is disclosed in U.S. Pat. No. 2,845,239 assigned to the Applicants' assignee. In older aircraft, pitch trim control was ordinarily provided by a trim tab on an elevator which was deflected relative to a fixed horizontal stabilizer, whereas in most modern transport type aircraft, long term trim control is provided by a rotatable stabilizer having an elevator deflected relative thereto for providing short term pitch attitude control. Once a statically stable aircraft has been trimmed to a constant angle of attack normally by an upward, i.e., trailing edge up adjustment of the stabilizer to maintain lift equal to weight, it will tend to return to the trimmed angle of attack whenever it is disturbed in pitch through manual or automatic operation of the elevator. During sustained flight in the automatic pilot cruise mode, i.e., constant altitude cruise, a substantial amount of fuel is burned off, and the resultant weight loss will require a corresponding reduction in lift and possible movement of the aircraft center of gravity relative to the center of lift. Accordingly, the angle of attack will normally be gradually decreased to decrease lift and balance any lift pitching moments. This is normally accomplished through some form of automatic trim control loop in the autopilot system. In a typical automatic trim system, when the altitude control signal calls for down elevator and a resultant down elevator position feedback signal, and when the latter signal exceeds a predetermined high (auto trim pull-in) threshold value for a predetermined period of time (to distinguish from short term pitch attitude stabilization), a trim motor is actuated which adjusts the stabilizer's trailing edge in a downward direction (from its previous position). This results in an altitude deviation signal of a polarity to drive the elevator toward its zero position. When the elevator position feedback signal reduces to a predetermined low (auto trim drop-out) value the trim motor is stopped. Normally, the trim initiation threshold is varied as a function of airspeed to provide desired control surface effectiveness. Of course, automatic trim is necessary in both directions to compensate for aircraft load changes in both directions but the present invention is primarily concerned with changing trim conditions associated with decreasing angle of attack during long term cruise fuel burn-off. The elevator trim deflection threshold pull-in and drop-out limits cannot be too low since aircraft stability would be adversely affected especially during low speed, low level flight conditions, nor can the threshold limits be too high since objectional pitching transients would be induced when the automatic flight control system in disengaged. In the present invention, the normal elevator trailing edge up trim thresholds are not changed because trailing edge up only adds pitching moment to stabilizer-induced pitching moment and does not represent unnecessary drag.

When the elevator is deflected relative to the stabilizer, there is always some aerodynamic drag. However, whenever the elevator is deflected in a direction to oppose pitching moments produced by the stabilizer, unnecessary aerodynamic drag is produced. Thus, a throttle increase and hence increased fuel flow is necessary to maintain cruise airspeed. Heretofore, this increased throttling and attendant increase in fuel consumption have been considered acceptable, but now significant savings in fuel costs may be realized by reducing this unnecessary increase in aerodynamic drag. A flight crew may reduce this undesirable drag manually by visually monitoring the elevator deflection on a meter and periodically setting any trim error to zero or substantially at zero before the normal trim threshold limit is exceeded. Such manual periodic reduction of trim error is both inefficient and a nuisance to the flight crew who may be distracted from their regular cockpit duties. Accordingly, there is a need to provide the aviation industry with a simple and efficient solution to the problem of reducing the increased and unnecessary drag induced by conventional methods of automatic stabilizer trim control such that significant savings in fuel costs may be realized.

SUMMARY OF THE INVENTION

In accordance with the invention, the aforementioned problems with respect to reducing the unnecessary drag induced by conventional stabilizer trim control systems are to a great extent alleviated or eliminated through the practice of the present invention. The present invention provides an automatic stabilizer trim system for automatic pilots which establishes threshold limits for the deflection of an elevator relative to a stabilizer such that the undesirable effects of drag induced by the opposed deflections of the stabilizer and elevator are reduced; for example, in normal cruise flight a stabilizer trailing edge up and elevator trailing edge down. The automatic stabilizer trim system includes a means for monitoring the deflection of the elevator relative to the stabilizer, and threshold detector means for comparing the output signal of the monitoring means to threshold limits for the sustained downward deflection of the elevator relative to the stabilizer. The threshold limits for such sustained downward deflection are reduced absolutely, or alternatively reduced periodically, thereby allowing the threshold detector means to activate the stabilizer trim motor when the reduced downward threshold limit has been exceeded for a predetermined time period. Thus, there is a reduction in aerodynamic drag and an increase in fuel savings as a result of the reduced downward threshold limit.

DESCRIPTION OF THE PREFERRED EMBODIMENT

Figure 1A:
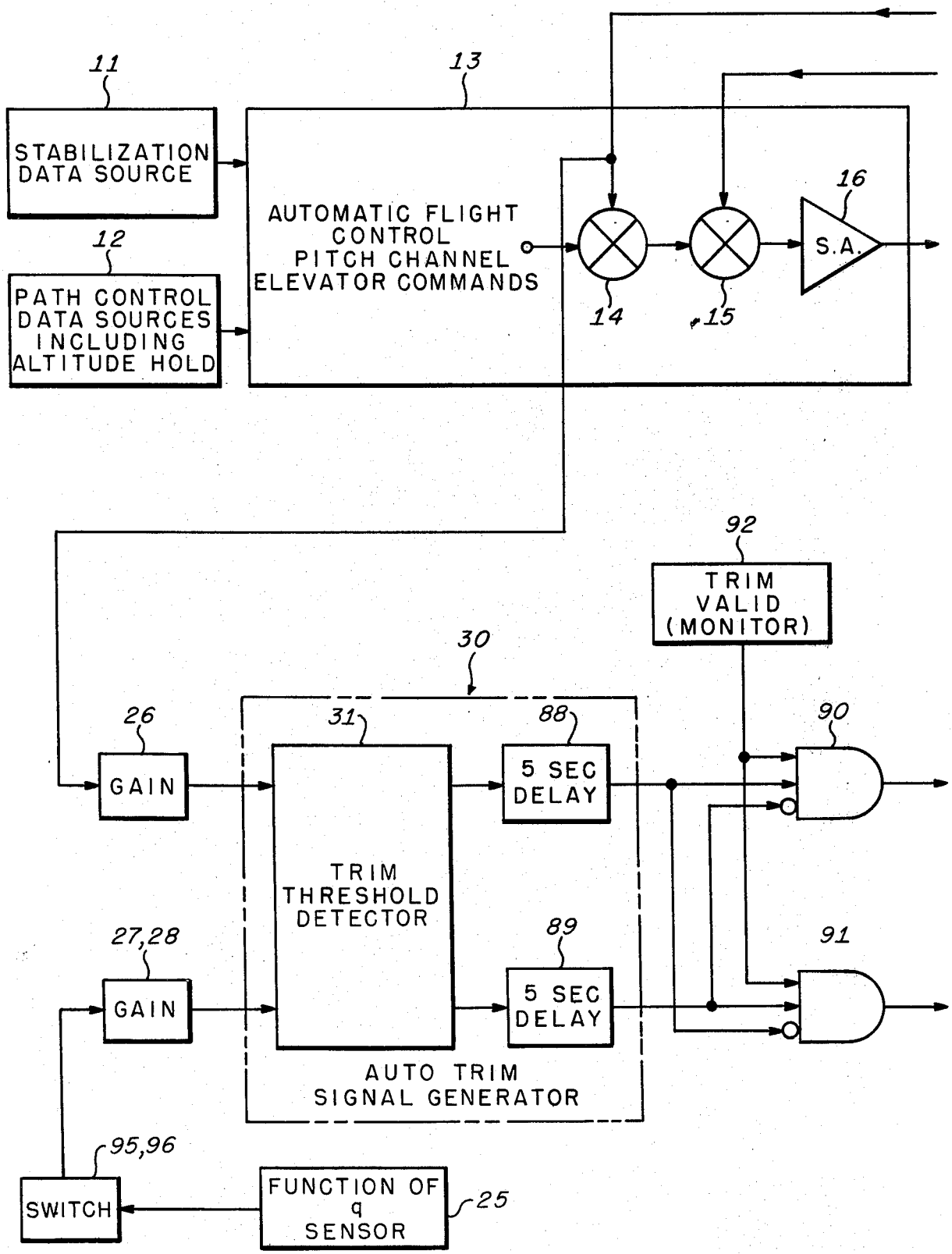
FIG. 1 which is comprised of FIGS. 1a and 1b is a block diagram of a conventional automatic flight control system incorporating the improved trim control system of the present invention.
Figure 1B:
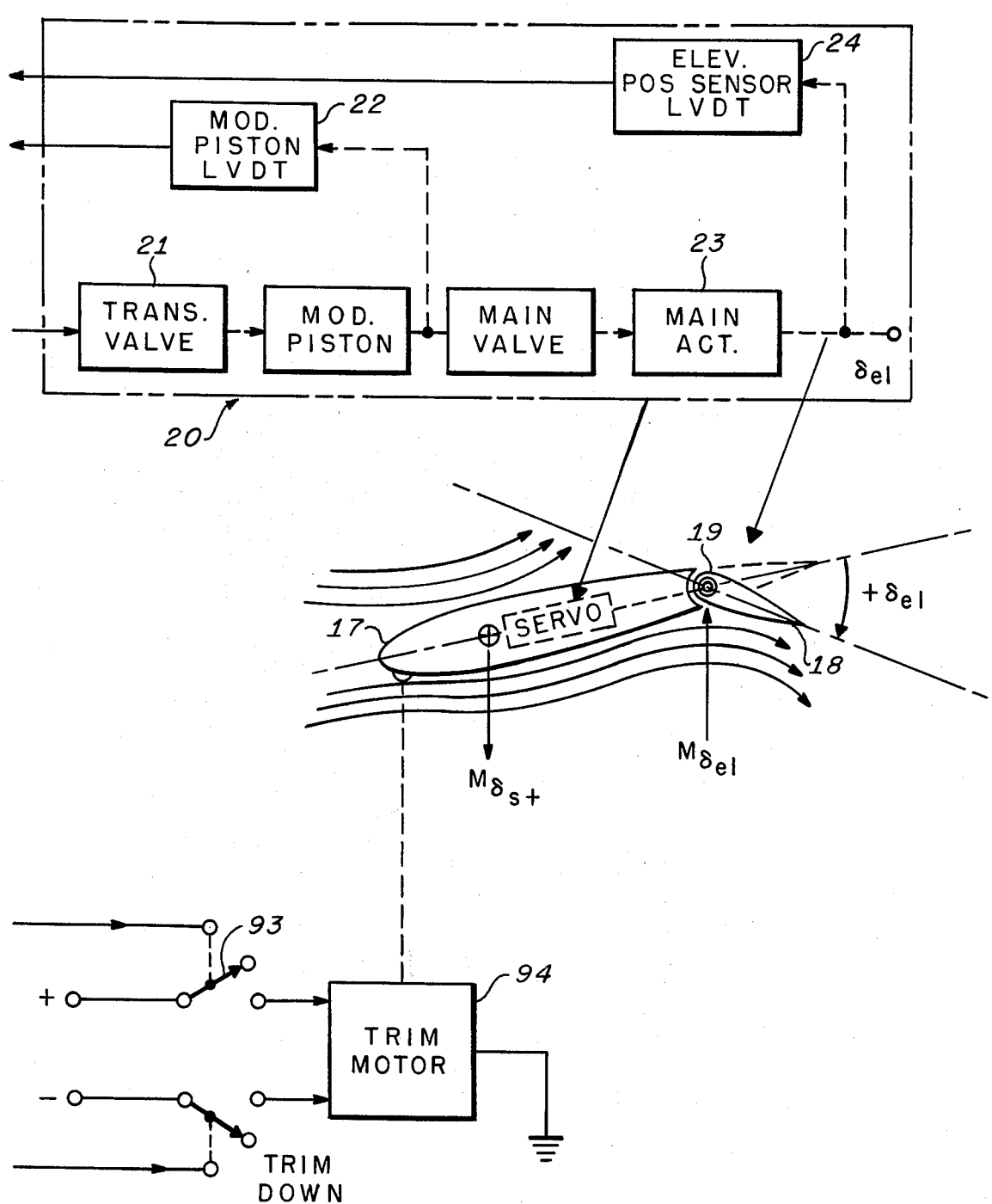

Referring now to FIG. 1, a block diagram of the pitch channel 13 of a conventional automatic pilot having an automatic trim control system coupled thereto is illustrated. The automatic flight control system, for example, of the type disclosed in U.S. Pat. No. 3,079,109, assigned to the Applicants' assignee, includes the pitch channel 13 coupled to stabilization data sources 11 and pitch control data sources 12 including a conventional altitude hold source. The automatic trim control system of such a flight control system is of the type which effectively and substantially streamlines an elevator 18 relative to a stabilizer 17 by moving the stabilizer to provide any required long term pitching moment.

A movement of the elevator 18 relative to the stabilizer 17 is effected by a conventional servo 20. In FIG. 1, a longitudinal axis is drawn through the stabilizer 17 and this axis intersects the elevator hinge 19. When the elevator 18 is aligned with the stabilizer longitudinal axis, the elevator is said to be streamlined or in the zero elevator position. When the elevator is deflected either upward or downward relative to the stabilizer 17, a deflection angle $\delta_{el}$ which is conventionally positive in the downward direction, is measured from the stabilizer longitudinal axis to the deflected elevator position. Elevator deflection about the stabilizer longitudinal axis is controlled by the servo actuator 20 which is coupled to the pitch channel 13 of the automatic flight control system via summing junctions 14, 15 and servo amplifier 16. The elevator servo 20 includes a mod piston transducer (LVDT) 22 to provide elevator rate feedback signals and an elevator position transducer (LVDT) 24 to provide position feedback signals to signal summing junction 14. The above described elevator servo system 20 may be of a type well known in the art, and is described for example, in U.S. Pat. No. 3,401,904 or the above U.S. Pat. No. 3,079,109, or it may be a dual servo-system of the type shown in U.S. Pat. No. 3,504,248, all assigned to the Applicants' assignee. The autopilot pitch channel 13 interfaces with a conventional altitude hold data source 12 for providing a control signal to the elevator servo 20 whenever the aircraft tends to depart from a selected or reference altitude, as disclosed, for example, in the above U.S. Pat. No. 3,079,109.

The elevator servo 20 is also coupled to an automatic trim signal generator 30 via an output lead from the elevator position sensor 24 and the usual signal-to-surface deflection gain network 26. A conventional air data computer 25 provides an input signal representative of the airspeed of the aircraft and usually designated by the term q. It is coupled to the automatic trim signal generator 30 via conventional signal-to-airspeed sensor gain networks 27, 28 and switching means 95, 96, as will be described below. The automatic trim signal generator 30 includes a trim threshold detector 31 and time delay means 88, 89 which will hereinafter also be described in greater detail. The output terminals of the time delay means 88, 89 are the output terminals of the automatic trim signal generator 30. Typically, trim logic means is provided which includes an AND gate 90 having a first and a second input terminal coupled to the output terminals of the signal generator 30, and an AND gate 91 which likewise has a first and a second input terminal coupled to the output terminals of the signal generator 30. A trim validation means 92 which may be derived from conventional monitor apparatus, for example, of the type disclosed in U.S. Pat. No. 3,401,904, assigned to the Applicants' assignee, is coupled to a third input terminal of the AND gates 90, 91 respectively. The output terminals of the AND gates 90, 91 are coupled to a trim relay 93 for providing a trim motor 94 with either a trim up or trim down command signal. The cross connects between gates 90 and 91 simply assure that trim up and trim down commands do not occur simultaneously. A trim up command signal rotates the stabilizer 17 trailing edge up, whereas a trim down control signal rotates the stabilizer 17 trailing edge down.

Figure 2:
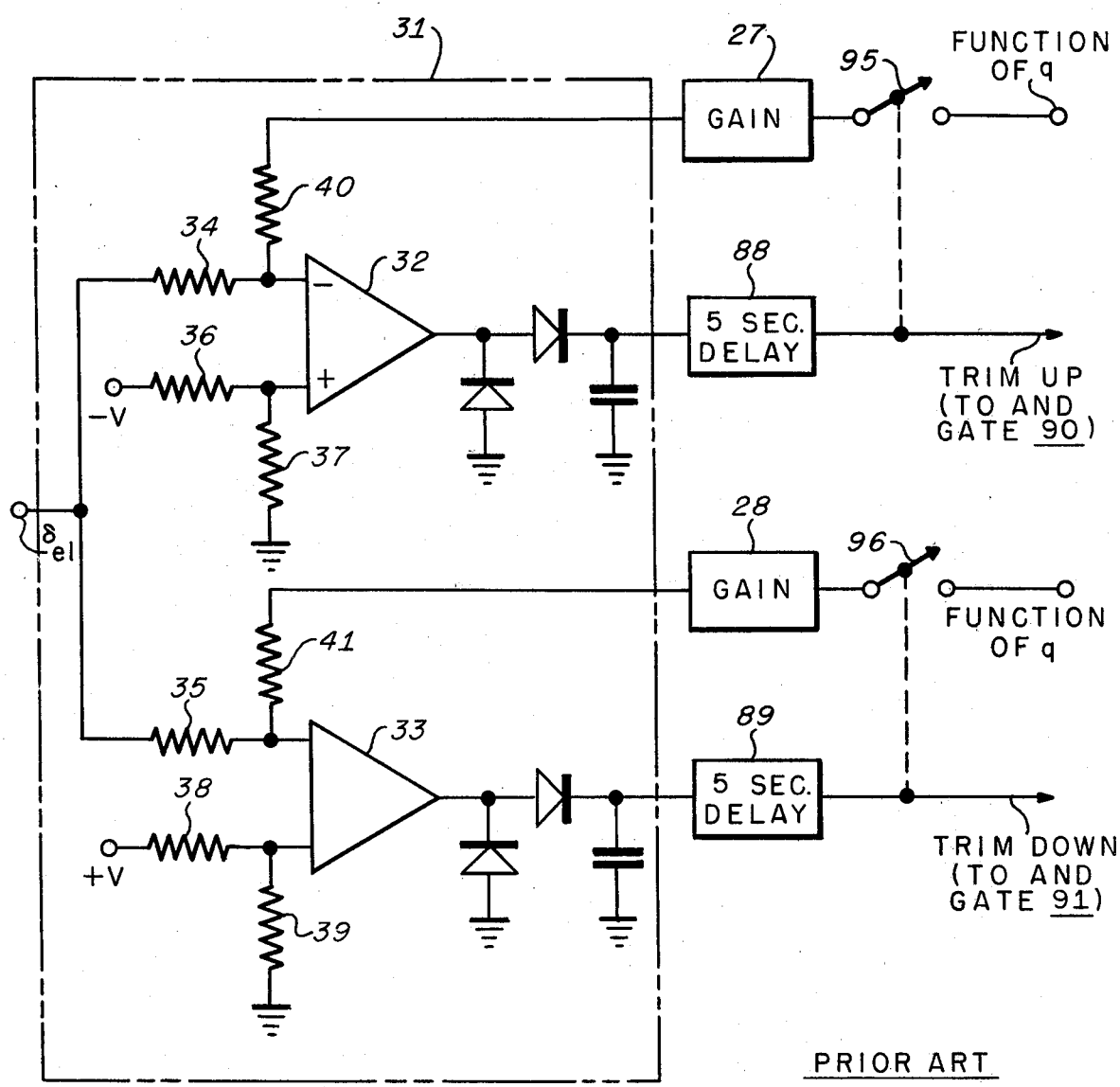
FIG. 2 is an electrical schematic of a conventional prior art trim threshold detector and a graph of the trim logic associated therewith.
Figure 2:
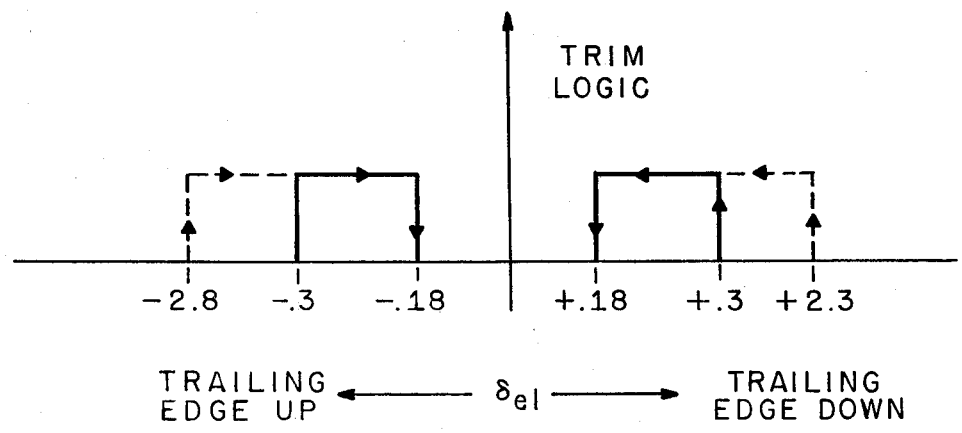

Referring now to FIG. 2, a simplified circuit schematic of a conventional trim threshold detector 31 which includes a trim up channel and a trim down channel having symmetrical threshold limits is provided. A first input signal, which is representative of the angular deflection of the elevator relative to stabilizer, is applied to the inverting input terminals of operational amplifiers 32, 33 via the resistors 34, 35, respectively. A second input signal, which is a function of the airspeed q, is also applied to the inverting input terminals of the operational amplifiers 32, 33 via gain networks 27, 28 and resistors 40, 41, respectively. A negative voltage source is applied to the non-inverting terminal of the operational amplifier 32 via the resistance network comprised of resistors 36, 37. A positive voltage source is applied to the non-inverting terminal of the operational amplifier 33 via the resistance network comprised of resistors 38, 39. The output signals from the operational amplifiers 32, 33 are applied to the five second delay means 88, 89 to provide inputs to the trim logic gates 90, 91 such that the trim motor receives either a trim up or trim down command signal. FIG. 2 also includes a graph of the pull-in and drop-out trim logic associated with the threshold detector 31, and it is hereinafter described in greater detail.

Figure 3:
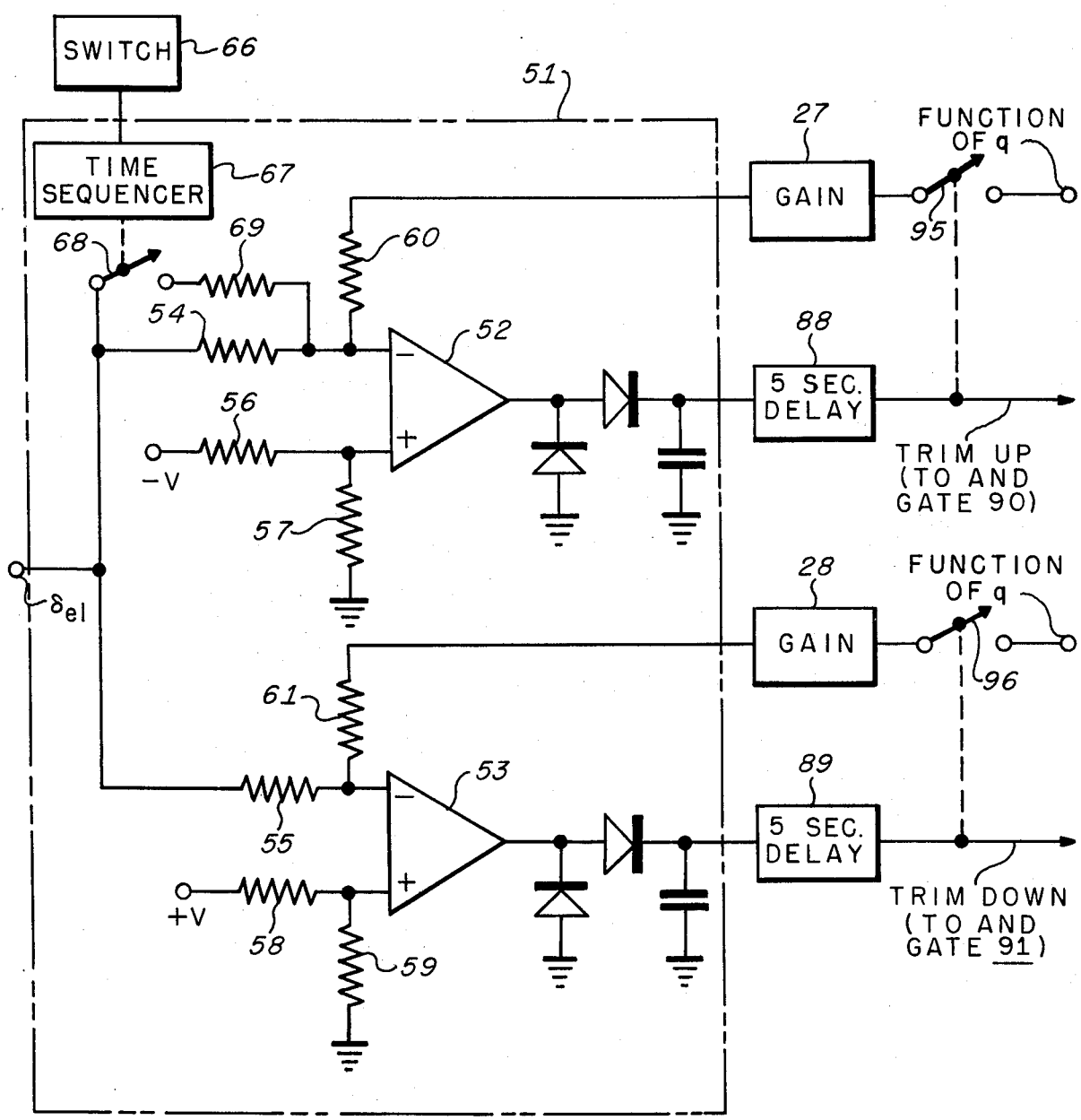
FIG. 3 is an intermittently operating embodiment of a trim threshold detector and a graph of the trim logic associated therewith.
Figure 3:
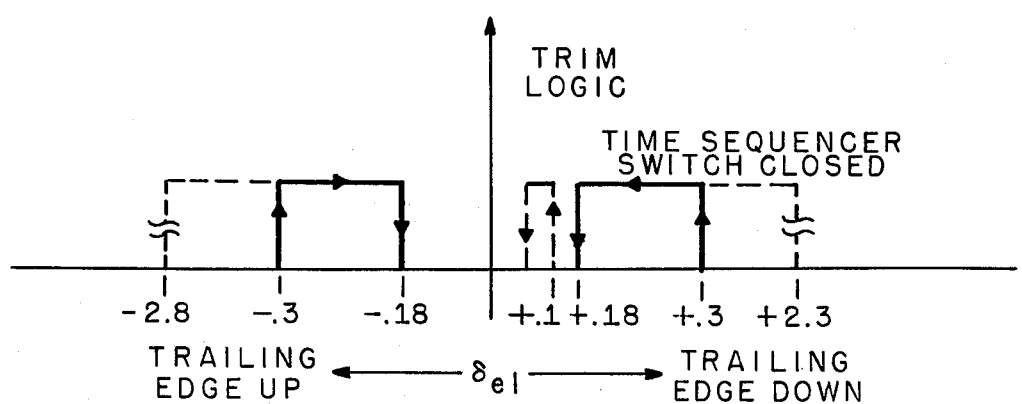

Referring now to FIG. 3, a simplified circuit schematic of a threshold detector 51 utilized in an intermittently operating embodiment of the present invention is provided. The threshold detector 51 is similar in design to the conventional threshold detector 31. The threshold detector 51, however, includes or interfaces with first switching means 66, a time sequencer 67, second switching means 68, and a resistor 69 which are not included in the conventional threshold detector 31. Preferably, the time sequencer may be comprised of a free running oscillator coupled to a counter which is conventionally reset at predetermined time intervals. The first switching means 66 permits operation of the time sequencer only in the constant altitude or selected altitude cruise mode. Thus, the time sequencer 67 may, for example, every ten minutes close the switching means 68 and place the resistor 69 in parallel with the resistor 54 when the first switching means 66 is closed. The parallel resistance provided by resistor 69 varies the input signal applied to the inverting input terminal of the operational amplifier 52 and effectively reduces the downward threshold limit of the threshold detector 51 as hereinafter described. FIG. 3 also includes a graph of the trim logic associated with the threshold detector 51, and it is also hereinafter described in greater detail.

Figure 4:
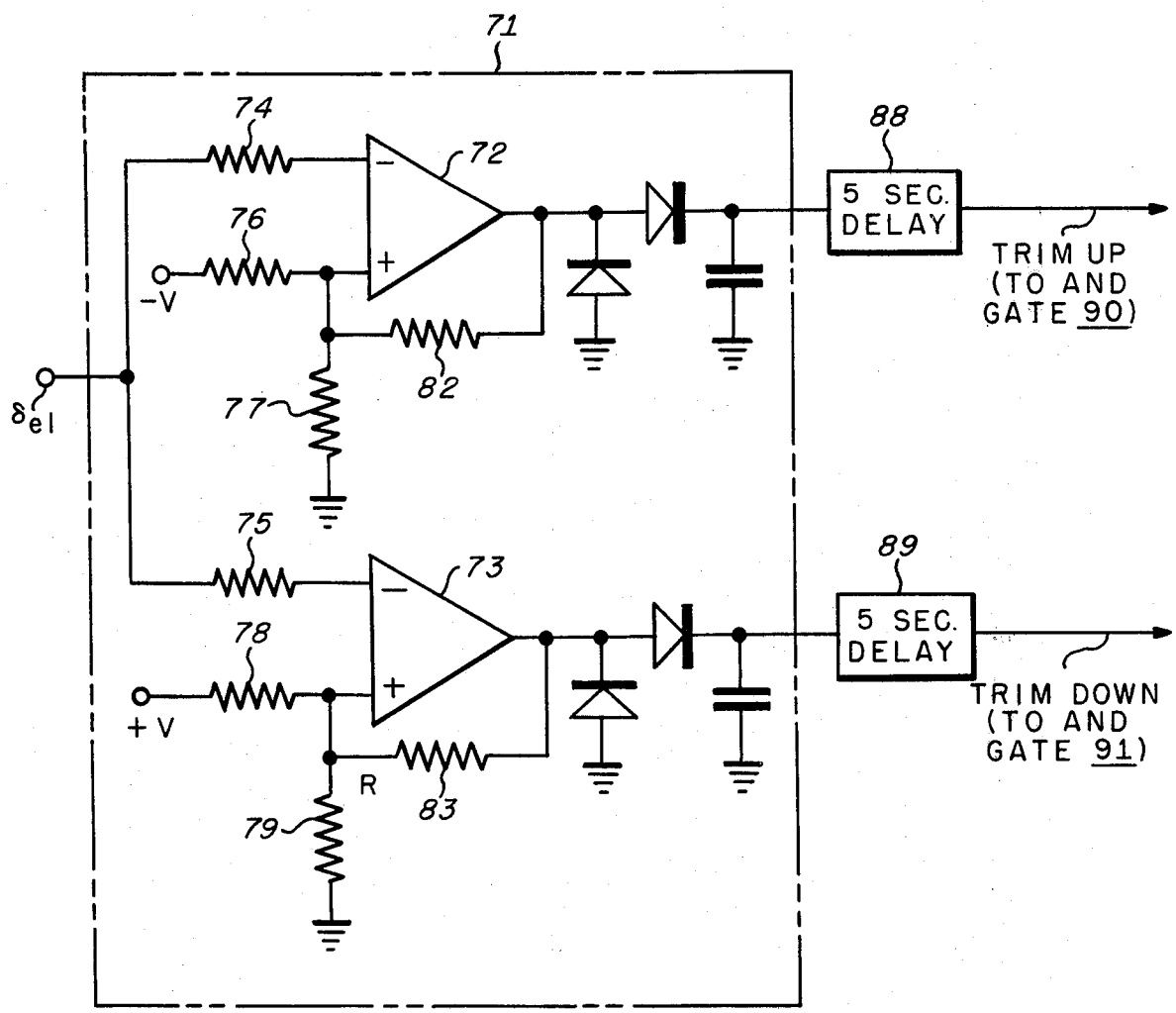
FIG. 4 is a schematic of a full time operating embodiment of a trim threshold detector and a graph of the trim logic associated therewith.
Figure 4:
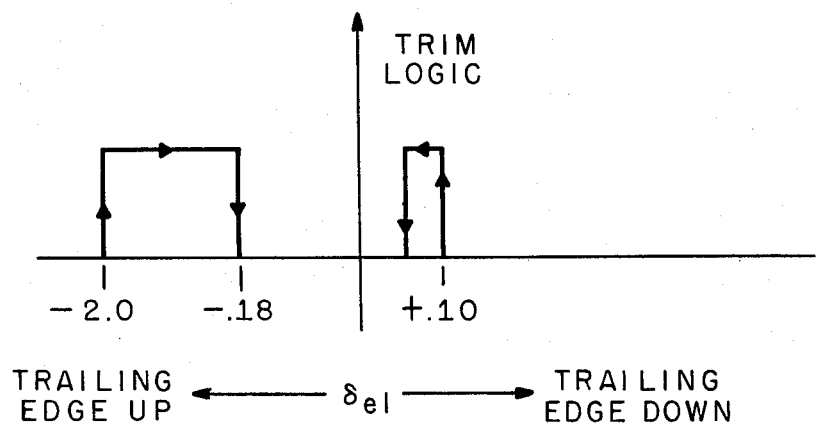

Referring now to FIG. 4, a similar simplified circuit schematic of a trim threshold detector 71 which is associated with a full time operating embodiment of the present invention is provided. The design of the threshold detector 71 is somewhat different from that of either the threshold detector 31 or the threshold detector 51. The threshold detector 71 eliminates the need for the airspeed input q, the gain network 26 and 27 and the resistors associated therewith as well as the time sequencer 67 and its associated switching means 66, 68 and the resistor 69. The threshold detector 71 includes feedback circuits having the resistors 82, 83 for providing feedback to the operational amplifiers 72, 73, respectively. FIG. 4 also includes a graph of the trim logic associated with the threshold detector 71, and it is hereinafter described in greater detail.

The pull-in/drop-out trim logic diagrams illustrated in graphic form in FIGS. 2, 3, and 4 are associated with the threshold detectors and with the trim logic circuitry comprised of the AND gates 90, 91 and the trim validation circuit 92 as illustrated in FIG. 1. Referring again to FIG. 2 and the trim logic graph associated with the conventional threshold detector 31 depicted therein, it can be seen that the trim command signals are enabled by the output terminals of the AND gates 90, 91, and that the states of the output terminals of AND gates 90, 91 are plotted along an axis that represents the angular deflection $\delta_{el}$ of the elevator 18 relative to the stabilizer 17. The axis designated trim logic represents the HIGH or LOW state of the output terminals of AND gates 90, 91. In the high speed cruise mode, as fuel burns off and the craft tends to increase altitude, the altitude error signal begins to increase and call for a down elevator to reduce the aircraft's angle of attack. The elevator 18 will creep downward relative to the stabilizer 17, the output terminals of the AND gate 90 remaining low until the downward predetermined deflection or trim pull-in threshold of, say 0.3°, has been exceeded as determined by a resistor 34 (the diodes block negative going signals and resistors 36, 37 provide a reference). Only the pull-in threshold has been exceeded, the output terminal of the AND gate 90 goes HIGH closing the relay 93 and driving the trim motor 94 to cause the stabilizer 17 to rotate in a trailing edge down direction from its previous position to reduce the angle of attack. The stabilizer 17 continues to so rotate until a predetermined drop-out threshold of, say 0.18°, is reached as determined by the removal of resistor 41, whereupon the trim motor 94 stops rotating the stabilizer 17, thus leaving the elevator 18 streamlined away from its streamlined position by 0.18° and producing an unnecessary aerodynamic drag. When the elevator is deflected upward relative to the stabilizer, the AND gate 91 operates in a manner identical to AND gate 90 to actuate the trim motor in a trailing edge up direction. In order to maintain desirable surface effectiveness at low airspeeds, and avoid unnecessary trim activity, the pull-in threshold limits are increased, say to 2.3°, as indicated by the broken lines. This threshold is determined by the value of resistor 40. Furthermore, when the pull-in trim threshold is exceeded, the q signal is inhibited by switch 95, to effectively remove resistor 40 and also so as not to change the drop-out threshold should q change.

It can be appreciated from the information provided above that the symmetrical threshold limits utilized in a conventional automatic stabilizer trim control system provide for inefficient operation of the aircraft. When the aircraft is flying steady state, the stabilizer provides the most significant portion of the necessary pitching moment to maintain the required angle of attack. The moment provided by the elevator, however, opposes the moment of the stabilizer when the elevator is deflected downwards. Thus, it can be seen that when the elevator trim threshold value stops the elevator at a downward position of 0.18°, the stabilizer and elevator pitching moments are of opposite polarity resulting in aerodynamic drag which requires a higher throttle setting to maintain the cruise airspeed.

Referring now to FIG. 3, it will be described how the operation of the threshold detector 51 when applied at 30 in FIG. 1 reduces the above unnecessary aerodynamic drag. The threshold detector 51 includes the time sequencer 67, the switch means 68, and the resistor 69, which are operative only in the cruise mode (high q value) when the switching means 66 is closed, thereby permitting normal trim function in other flight modes. Switch 66 may be operated by conventional autopilot logic responsive to the pilot selection of altitude hold above a predetermined flight level, say above 18,000 feet. As determined by flight test or arbitrarily, the timer 67 periodically operates at predetermined intervals, say on the order or every 10 minutes, to close the switch means 68 and to place the resistor 69 in parallel with resistor 54. The values of resistors 56, 57 and 69 are selected to effectively and substantially reduce the pull-in threshold, say to 0.10° instead of the conventional 0.30°, and the drop-out threshold is similarly and substantially reduced to a value on the order of, say 0.05° to 0.07°, depending upon the overall steady state stability characteristics of the aircraft.

Referring to the trim logic graph provided in FIG. 3, the above described reduced threshold limits are illustrated. Note that the inclusion of the time sequencer in the trim system effectively renders the prior art trim thresholds ineffective during constant altitude cruise operations. It safely and substantially reduces the trim pull-in/drop-out thresholds such that the elevator is maintained substantially streamlined with the stabilizer, thereby substantially eliminating any unnecessary aerodynamic drag. It will be noted that when the elevator is deflected upward relative to the stabilizer which is referred to as the trailing edge up position, the trim logic of the threshold detector 51 operates in a manner identical to the threshold detector 31 illustrated in FIG. 2.

Referring again to FIG. 4, the operation of a full time operating threshold detector 71 provides an even more effective and reliable technique for reducing the aerodynamic drag associated with stabilizer trim control. The threshold detector 71 establishes a trailing edge up pull-in threshold which is fixed at −2.0°, while the drop-out threshold is maintained at −0.18°. Moreover, the trailing edge down pull-in threshold is reduced to a fixed 0.10°, and the drop-out threshold is reduced to a value less than 0.10°. Unlike the threshold limits of detectors 31, 51, the threshold limits of detector 71 are independent of airspeed, as illustrated in the trim logic graph of FIG. 4. The values of the resistors 74, 76, and 77 are selected such that the timer 88 is tripped to supply, after five seconds, a logic signal via AND gate 90 to close the trim motor relay 93 in the trim up position. When the output of the operational amplifier 72 goes positive to trip the timer 88, the feedback circuit having the resistor 82 changes the reference voltage at the non-inverting input terminal of the operational amplifier 72 to effectively reduce the drop-out threshold logic voltage to less than 0.10° of elevator deflection, e.g., 0.05° to 0.07°. The trim down channel of the threshold detector 71 includes resistors 75, 78 and 79 which have values selected to provide a trim down pull-in threshold of −2.0° and the feedback resistor 83 which is selected to provide a drop-out threshold of 0.18° as described above. Thus, it can be appreciated from the trim logic graph of FIG. 4 that the threshold detector 71 absolutely limits the steady state downward deflection of the elevator relative to the stabilizer on a full time basis and effectively permits the elevator to be maintained substantially streamlined to thereby reduce the undesired increase in aerodynamic drag associated with conventional stabilizer trim control.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A reduced aerodynamic drag automatic stabilizer trim system for aircraft autopilots which includes switch means operable in one direction or the other depending upon sustained elevator positions above or below predetermined threshold positions relative to said stabilizer for positioning said stabilizer so as to substantially streamline said elevator and maintain said aircraft on a predetermined flight path, the combination comprising:
  (a) means for providing a signal corresponding to the magnitude and sense of elevator position relative to said stabilizer position; and
  (b) trim threshold detector means, having first and second channels for providing at least first and second threshold values for each channel, responsive to said elevator position signal when said elevator position signal is in excess of either of said first threshold values, for operating said switch means to position said stabilizer in a direction to reduce the value of said elevator position signal to said second lower threshold values, said first and second threshold values of one of said trim threshold detector channels being substantially less than the first and second threshold values of the other of said trim threshold detector channels and the substantially lesser threshold values are dependent upon the polarity of said elevator position relative to said stabilizer position producing opposed pitching moments on said aircraft.

2. The trim system as set forth in claim 1 further including time delay means responsive to the operation of said first and second threshold detector channels for operating said switch means only upon sustained output values of said trim threshold detector means.

3. The trim system as set forth in claim 2 further including means responsive to craft airspeed for varying said first threshold values of each of said threshold detector channels as a function of airspeed.

4. The trim system as set forth in claim 3 further including means responsive to said time delay means for rendering said second values of each of said threshold detector channels independent of airspeed.

5. The trim systems as set forth in claim 2 further including time sequencer means coupled with said one of threshold detector channels for initiating its operation at predetermined time intervals.

* * * * *